Patented June 22, 1943

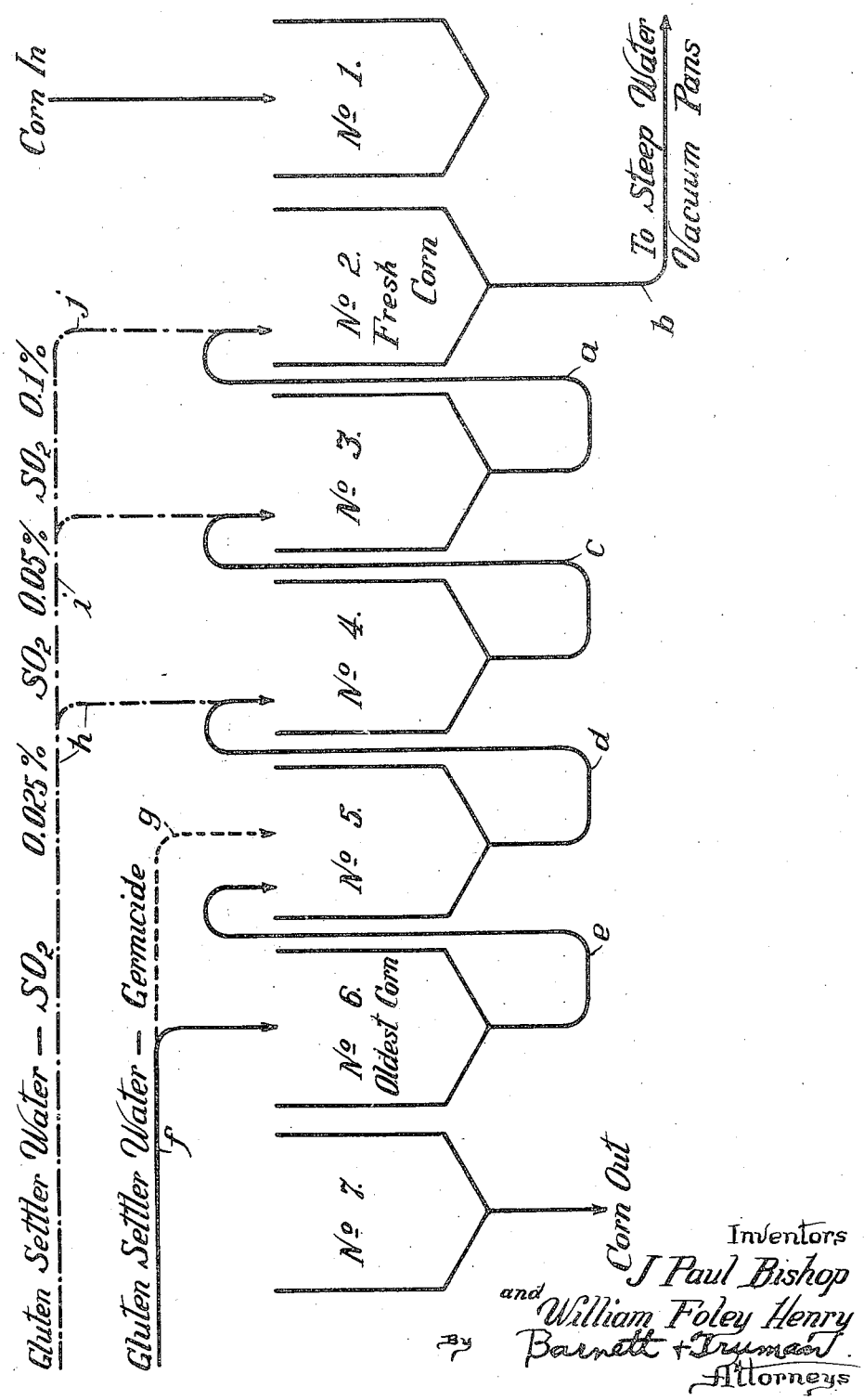

2,322,413

UNITED STATES PATENT OFFICE 2,322,413

PROCESS OF STEEPING CORN

J Paul Bishop, Clarendon Hills, and William Foley Henry, Argo, Ill., assignors to Corn Products Refining Company, New York, N. Y., a corporation of New Jersey Application May 10, 1940, Serial No. 334,356

7 Claims. (Cl. 127—68)

This invention relates to the production of starch from corn (maize); and the object of the invention is to provide certain improvements in the process of obtaining starch from corn, more particularly in the steeping of the corn prior to the separation of the starch from the other corn constituents, whereby the amount of starch converted into solubles is reduced to a minimum, with consequent higher starch yields, the thinning of the starch, that is to say, its partial hydrolysis by reason of which the starch when boiled with water forms a thinner paste than is desired (this being the characteristic of all corn starches produced by present day methods), is very considerably reduced, and other advantages are obtained to be mentioned hereafter.

In the production of starch from corn, the following process steps have been customary: (1) The corn is steeped in water containing relatively high concentrations of sulphur dioxide in order to soften the grain and condition it for the subsequent separating operations, and to remove soluble substances therefrom, the operation being ordinarily carried out in a series of steep tanks on the counter-current principle; after which the steep water from the last steep tank containing the freshest corn is evaporated and added to the non-starch constituents of the corn for the production of cattle feed. (2) The steeped corn is broken up and the germs separated and floated off in water containing starch in suspension. (3) The remaining corn material is subjected to screening operations to separate the slop (hull and fibre) from the starch and gluten. (4) The gluten is then separated from the mill starch (starch gluten and water mixture) by a tabling operation for which centrifuging may be substituted. (5) The gluten is separated from the starch table effluent and the effluent, known as "gluten settler water," is ordinarily returned to the steeps, in part or wholly for use as a steeping water. (6) The starch from the starch tables is washed on washing filters to remove solubles and the wash water returned, ordinarily, to the separating operations. (7) The washed starch is then dried in drying kilns or other suitable drying apparatus.

In the production of starch according to this method, a certain amount of the starch is solubilized, particularly in the steeping operation, and is consequently lost as starch. This solubilizing of the starch is due, primarily, to enzymes or amylases native to the corn which enter the steeping system from two sources, with the corn to be steeped and with the gluten settler water when this water, or other process water, is used for steeping. The enzymes solubilize the starch to some extent and the soluble starch passes into the steep water and is recovered in the cattle feed but with consequent loss in starch yield.

The method of starch production outlined above also brings about a thinning of the starch. All commercially produced corn starches at the present time, so far as applicants are aware, boil to a thinner paste than in theory they should. This thinning is due, in part, to the enzymes native to the corn, but in larger measure, probably, to the presence of acidic material in the steeps. In the first place, if sulphur dioxide is used as an agent in the steeping for softening and conditioning the corn for the separating operations, the acidic character of the sulphur dioxide tends to bring about the thinning of the starch. Thinning of the starch is also produced by the presence in the steeping system of lactic acid due to the activity of the lactic acid bacteria, probably entering the system in part from the air, and in part with the corn; by the presence of amino acids, due to the activity of proteolytic bacteria which are believed to be native to the corn. If gluten settler water is used for steeping, it will ordinarily contain a small amount of sulphur dioxide, perhaps 0.005% based on the weight of the gluten settler water (an amount which is probably negligible, from a practical point of view), but much larger quantities of lactic acid, about 0.03%, and amino acids, about 0.8%, which are developed under the favorable incubating conditions existing in the gluten settlers. The gluten settler water also contains large number of lactic acid and amino acid bacteria which produce additional acids during the steeping operation. This acidic material also contributes to the solubilizing of the starch and also of the protein. The activity of the enzymes contributes to thinning of the starch, solubilizing and thinning being related phenomena.

The production of amino acids in the steeping system has a further disadvantage: the proteolytic bacteria (and also proteolytic enzymes) act upon the protein in the corn material to produce amino acids and soluble intermediate products which darken the cattle feed, which is undesirable. The lactic acid has a similar effect. However, it is desirable that the protein in the corn should be slightly modified during the steeping operation. This is effected, apparently, by enzymic and bacterial action.

It is the primary object of the present invention to provide certain improvements in the steeping of the corn, which improvements are useable separately but preferably are to be used in combination for their aggregative effect, whereby the thinning of the starch and the solubilizing of some of the starch and protein are reduced to a minimum; and whereby other advantages are obtained, for example, better flotation of the germ, reduced amount of steep water, elimination of the tendency of the steep water to foam in the steep water vacuum pans, reduced losses of volatiles in the steep water concentrating operation and the elimination of sulphur dioxide fumes in the factory, which are somewhat objectionable.

These improvements comprise:

(1) The sterilization of the steeping water before it is introduced into the steeps, where gluten or other process water is used for steeping, preferably by means of heating to such a temperature and for such a period of time that all of the starch solubilizing enzymes together with most of the lactic acid and amino acid bacteria, except, possibly, some of the thermophylic bacteria, are killed or at least are rendered inactive during the steeping period.

(2) The acidic material, the lactic acid and amino acid entering the steeps with the gluten settler water and such organic acids as may be developed in the steeping operation, together with the sulphur dioxide when such is used for softening the grain, are buffered by a suitable salt so that the steeping takes place with the steep water at substantially the normal pH of the corn; the pH of the corn being calculated by soaking the corn in water and determining the pH of the filtrate. The buffer is provided, preferably, by introducing into the steeps, in place of the usual sulphurous acid, an alkaline bisulfite, preferably sodium bisulfite, which when disassociated forms sulphur dioxide and sodium sulfite.

(3) There is added to the steep water a small amount of benzoate of soda which acts to inhibit, to a large extent, the solubilizing effect of the enzymes native to the corn and of the lactic acid and proteolytic bacteria, thus reducing to a minimum the amounts of lactic acid and amino acids formed during the steeping operation. Benzoate of soda, a common germicide, has certain characteristics which make it peculiarly suitable and effective to prevent the thinning of the starch during the operation of steeping the corn. It is non-toxic which is essential since starch is often used in food products and the slop from the wet starch system for cattle feed. A very small amount will effectively accomplish the desired result, as little, in fact as 0.02%, by weight of the gluten water, so that the cost of the use of this germicide is relatively small and the amount of the same remaining in the solids, the starch, gluten and slop is insignificant. It is soluble so as to be easily dispersed throughout the material in the steeps and so can be washed out of the starch completely, when, as is customary, the starch is washed repeatedly on vacuum filters. Its potency as a germicide is not affected by the relatively high steeping temperatures (115°–135° F.). It does not interfere with the proper conditioning of the protein which is one of the objects of the steeping operation. That is, while the solubilizing of the protein and the production of amino acids is undesirable, a certain modification of the corn protein through bacterial and enzymic action during the steeping operation seems to be highly desirable if not essential. Benzoate of soda, while inhibiting the formation of acids through bacterial and enzymic action allows the protein to be modified to the extent desired. This germicide does not react with the starch and does not interfere with the softening action on the corn of the sulfur dioxide. Where it is used with sulfur dioxide in steeping, it becomes unnecessary to add $SO_2$ to the separating operations, assuming that is, that enough of the benzoate of soda enters these operations from the steeps or is supplemented by additions of the germicide to the wash water used in the separating operations. Benzoic acid may be used in place of benzoate of soda.

(4) The steeping operation may be divided into two periods during the first of which the corn is steeped with sulphur dioxide, either in the form of sulphurous acid or sodium bisulfite, and during the second of which the steeping is continued without sulphur dioxide but with a germicide in the steep water. With this operation it is possible to omit the presterilization of the gluten settler water, which, however, is optional and to steep during the first period at the customary low pH, that is without buffering the acid.

The sterilization of the gluten settler water before introduction into the steeps may be effected by means other than heat, as for example, germicidal agents having the characteristics above indicated.

The buffer for raising the pH of the steeping system may be introduced other than by use of an alkaline bisulfite. A suitable buffering salt might be used in connection with the old method of introducing sulphurous acid into the steeps.

It would be possible, if not economically practical, to use fresh water, in place of gluten settler water or other process water for steeping, in which case the principles of the present invention could be employed so far as applicable.

It is possible not to use sulphur dioxide, in any form, in the steeping operations, but applicants' experience indicates that even using the other expedients of the present invention, without sulphur dioxide, the results are not as favorable as when sulphur dioxide or some agent for softening the corn is used. Where sulphur dioxide is not used the separating operations are somewhat less effective. That is, there will be a larger starch content in the slop.

Where sodium bisulfite, or other alkaline bisulfite is used in the steeping operation, it is desirable to reduce the pH of the mill starch (starch and gluten magma) going to the starch tables to about 4.5 (4.2–4.8) in order to obtain the best possible separation as between starch and gluten on the tables.

In case sulphur dioxide is not used in the steeping operation, or used only in the first part of such operation, it will be desirable to introduce small quantities of the steeping germicide into the water or starch wash water, used in the mill house separating operations.

The invention will be illustrated in the following specific examples. These examples are to be regarded as typical and informative only and not as limiting the invention to the specific operating data given therein. It is the intention to cover all equivalents and also all modifications of the specifically given procedures within the scope of the appended claims. The proportions are given in terms of parts by weight, unless otherwise indicated and workable ranges are indicated in parentheses, the limits of which, however, are not critical.

The appended drawing is a flow sheet illustrating particularly the process described as Example 6.

*Example 1.*—Gluten settler water, 600 parts, is boiled for 20 minutes (10-30 minutes) or until all of the starch solubilizing enzymes and most of the bacteria have been destroyed. The gluten settler water is cooled to about the steeping temperature and there is added to it 0.16% of sodium bisulfite, based upon the weight of the gluten settler water (0.04% to 0.3%) to give the gluten settler water a pH of about 6.0 (5.8 to 6.2) and an $SO_2$ content of 0.1% (0.03% to 0.2%). There is also added to the gluten settler water 0.05% (0.02% to 0.2%) of sodium benzoate, the quantity being based upon the weight of the gluten settler water. The steep water thus formed is used for steeping 400 parts of corn. The steeping temperature is preferably 125° F. (115° to 135° F.) and the steeping time 40 hours (30 to 50 hours). The corn may be steeped by the usual counter-current steeping method as illustrated for example in United States patent to G. M. Moffett, No. 1,655,395, January 3, 1928. Acid is added to the mill starch before tabling so as to give the mill starch a pH of 4.5 (4.2 to 4.8).

Any soluble bisulfite may be used in place of sodium bisulfite, for example, it will be possible to use, except for the matter of cost, ammonium bisulfite or potassium bisulfite. In place of using a bisulfite, it will be possible to introduce sulphurous acid into the steep water and with it a suitable buffer such as sodium sulfite; or a sufficient amount of alkali could be added to raise the pH to about 6.

*Example 2.*—The procedure is the same as in Example 1 except that the germicide is Nalco No. 21, made by the National Aluminate Company and understood to be sodium pentachlor phenate. The amount used is preferably 0.002% (0.002% to 0.005%) based on the weight of the gluten settler water.

*Example 3.*—The gluten settler water is subjected to a sterilizing treatment by boiling for 20 minutes (10 to 30 minutes) or until all of the enzymes and bacteria, and most of the thermophyles have been destroyed, thus rendering the water substantially sterile. Its pH is then adjusted to 6.0 (5.8 to 6.2) by soda ash, lime or other cheap neutralizing agents. Water may be added, if necessary, to give proper volume for steeping. Sulphur dioxide is not used in any form. The dilute, substantially sterile gluten water, is run into the steeps on the corn in the usual manner. The germicide used is sodium benzoate and is added at one time, and not in increments, in the amount of 6.5 pounds (6.0-7.0 pounds) to 1000 bushels of corn. The sodium benzoate is preferably 0.05% on the weight of the gluten settler water.

*Example 4.*—In this case of gluten settler water is not boiled or otherwise presterilized. To 600 parts of gluten settler water is added 0.16% (0.04% to 0.3%) of sodium bisulfite to give the gluten settler water a pH of about 6.0 (5.8 to 6.2) and a sulphur dioxide content of 0.10% (0.03% to 0.20%), and also 0.05% of sodium benzoate, based on the weight of the gluten settler water, which may be varied between 0.02% and 0.2%. The steeping operation is carried out as specified in Example 1.

*Example 5.*—The procedure is the same as in Example 3 except that the germicide used is about 6 pounds (5.8 to 6.5 pounds) of benzoic acid to 1000 bushels of corn. In terms of weight of gluten settler water the benzoic acid will be 0.05% (0.02% to 0.2%).

*Example 6.*—In this preferred example of applicants' improved steeping process, gluten settler water is preferably used as a steeping water but without presterilization, which expedient under these conditions is not necessary, although it may be used for its additive effect. The characteristic feature of the process is that sulphur dioxide, or some other agent for softening the corn is used during the first part of the steeping operation, that is, on the fresh corn and preferably without the germicide, the sulphur dioxide being almost immediately absorbed in the corn, and the steeping operation being completed on the partially steeped and softened corn with gluten settler water or other steeping water containing one of the above specified germicides, or its equivalent preferably without the addition of any sulphur dioxide. By this process the acid content of the steep water is kept relatively low so that it is not necessary to use a buffer. That is, sulphurous acid is employed instead of sodium bisulfite, in the first stage of the process, although sodium bisulfite may be used if desired for such additional effect as it may have.

The operation of the process is illustrated in the appended drawing which is a flow sheet of a counter current system of steeping, employing five active steep tanks, and consequently five steeping periods for each batch of corn, these periods being preferably eight hours in length so that the entire steeping process, for any one batch of corn, is forty hours. The number of the active steeps may, of course, be increased or decreased and also the length of each steeping period.

Referring to the drawing, steep No. 1 is an inactive steep into which the fresh corn is being introduced. Steep No. 2 contains the freshest corn undergoing steeping and receives its steep water from steep No. 3 through pipe *a*. The steep water from steep tank No. 2 goes through pipe *b* to the steep water vacuum pan. Steep tank No. 3 contains corn which has been steeped for the next shortest time. It receives steep water from steep tank No. 4 through pipe *c*. The corn in steep tank No. 4 has been steeped longer than the corn in No. 3, by one period, and the corn in steep tank No. 5 has been steeped for one period longer than the corn in steep tank No. 4. The steeping liquid from steep tank No. 5 goes into steep tank No. 4 through pipe *d*. The oldest corn is in steep tank No. 6, the steep water from which goes through pipe *e* to steep tank No. 5. Steep tank No. 7 contains corn which has been steeped for the entire five periods. This tank is shown as cut out of the system and discharging its corn to the mill house operations. It will be understood that at the end of each eight hour period one steep tank will be cut out and a new steep tank cut into the system; for example, No. 1 will take the place of No. 2, No. 6 the place of No. 7 and No. 7 the place of No. 1, this being accomplished not, of course, by moving the tanks, or transferring their contents but by adjusting their connections.

The drawing assumes operation after one full cycle has been completed.

During the first period of the next, and each ensuing cycle, gluten settler water containing a germicide, enters steep No. 6 through pipe *f* and flows through from this steep into steep No. 5 and thence through the series of tanks and to the steep water vacuum pans. At the end of this first period, tank No. 6 is cut out of the system and No. 5 becomes the last steep of the series and contains the oldest corn in process. Tank No. 5 now receives gluten settler water, containing the germicide, through pipes $f$, $g$. At the end of the second period steep tank No. 4 becomes the last steep of the series and this steep receives through pipe $h$ gluten settler water, without any germicide, but containing 0.025% of sulphur dioxide based on the weight of the gluten settler water. This steep water flows from tank No. 4 to tank No. 3, and through the other steep tanks of the series including those which have been added on to the fresh corn end of the steeping apparatus.

At the end of the third period steep tank No. 3 contains the oldest corn and it receives through pipes $h$, $i$ gluten settler water, without germicide, but containing $SO_2$, preferably in a greater amount than was contained in the gluten settler water going to tank No. 4; in an amount, for example, of 0.05% of the gluten water. At the end of the fourth period, steep tank No. 2 contains the oldest corn it receives through pipes $h$, $i$, $j$ gluten settler water, without germicide, and with a sulphur dioxide content of 0.1%.

Thus the fresh corn in each steep tank is steeped for three periods with a steep water containing sulphur dioxide in decreasing amounts from 0.1% to 0.025%, as the capacity of the corn for absorbing the sulphur dioxide is decreased. During these periods the corn is softened but, due to the absorption of the sulphur dioxide in the corn, the acidic material in the steep water is not greatly increased by the introduction of the sulphur dioxide, so that little or no thinning of the starch results. During the final two periods, in respect that is to the age of the corn undergoing steeping, the steeping is carried on with gluten settler water containing a germicide to inhibit the activity of the enzymes and bacteria which, experience has shown, are particularly active during the latter part of the steeping operation. A germicide could be used in the water containing the $SO_2$ but this does not seem to be necessary in actual practice.

The germicide used may be the Nalco No. 21, specified in Example 4, the amount being about 0.002% of the germicide to a million parts of gluten settler water. Other germicides could be used such as 0.05% (0.02% to 0.2%) of benzoate of soda based on the weight of gluten settler water. Or one may use an insoluble, volatilizable germicide such as the halogenated aromatic hydrocarbons monochlor benzene and/or orthochlor toluene specified in said application of Carl Bergquist.

Since the corn will go from the steeping system into the separating operation with very little sulphur dioxide in form to prevent sliming, it is advisable to introduce into the starch wash water used in the separating operations small quantities of the germicide used for steeping, for example 0.002% of Nalco No. 21 to 0.005% based on the weight of the starch wash water. Or sulphur dioxide may be introduced in sufficient quantities to give the mill house magmas the customary sulphur dioxide content.

*Example 7.*—The process is the same as in Example 6 except that there is used 0.1% of lactic acid instead of sulphur dioxide. Lactic acid could be used in other steeping operations, according to the invention, particularly the steeping operations at low pH.

Assuming that starch from corn steeped by the usual sulphur dioxide methods of recent years will have a Scott test index of 85, the starch from the same corn treated in accordance with the processes of the present invention may have a Scott in the neighborhood of 95.

The amount of volatile lost in concentrating the steep water may be reduced from 60 pounds to 20 pounds per 1000 bushels of corn.

The increase in yield of starch will be in the neighborhood of 600 pounds per 1000 bushels of corn.

The Scott test for determining viscosity of thick boiling starches, to which the above Scott test indices refer, is carried out as follows: 15 grams of 12% moisture starch to be tested is mixed with 280 cc. of distilled water at room temperature. The beaker containing the mixture is put into a boiling water bath and stirred constantly for five minutes by means of a mechanical agitator rotating at 200 revolutions per minute. At the end of five minutes the beaker is covered with a watch glass and the contents allowed to boil for another period of five minutes. At the end of ten minutes the watch glass is removed, the condensate is drained back and the material stirred, at the above rate the draining and stirring taking ten seconds. The watch glass is put back on the beaker and the mixture allowed to boil for one minute and fifty seconds or until twelve minutes time has elapsed. The watch glass is removed, the condensate is drained back into the beaker and contents stirred, these operations taking fifteen seconds. At the end of twelve minutes and fifteen seconds, elapsed time, the contents of the beaker is transferred to a Scott cup, described below, and at the end of fifteen minutes, total elapsed time, the plunger of the valve cup is withdrawn, allowing the paste to pass into a graduated cylinder arranged below the cup. The Scott index for any given paste is the number of seconds required for the delivery of 50 cc. of the starch paste from the cup. The Scott cup is a cup or funnel having a discharge tube in the bottom about 3.175 mm. long with an orifice about 1.588 mm. in diameter which is closed by a plunger valve. The orifice is adjusted as to diameter on the basis of a master cup. The average commercially made, non-modified corn starch, when tested as above, has a Scott between 85 and 90.

This application is a continuation in part of application of Bishop and Henry, filed April 1, 1939, Serial No. 265,587.

We claim:

1. In the production of starch from corn the improvement which comprises: steeping the corn with a steep water containing a small quantity of benzoate of soda to inhibit enzymic and bacterial activity and the production of acids, whereby the thinning of the starch is minimized.

2. In the production of starch from corn the improvement which comprises: steeping the corn with a steep water containing 0.02% to 0.2%, by weight of the steep water, of benzoate of soda to inhibit enzymic and bacterial activity and the production of acids, whereby the thinning of the starch is minimized.

3. In the production of starch from corn the improvement which comprises: steeping the corn with a steep water containing a germicide of the group consisting of benzoate of soda and benzoic acid, to inhibit enzymic and bacterial activity and the production of acids whereby the thinning of the starch is minimized.

4. In the production of starch from corn the improvement which comprises: steeping the corn with gluten settler water, as a steep water, containing from 0.02% to 0.2%, by weight of the steep water, of benzoate of soda to inhibit enzymic and bacterial activity and the production of acids whereby the thinning of the starch is minimized.

5. In the production of starch from corn the improvement which comprises: steeping the corn with a steep water containing sulfur dioxide to which is added a small quantity of benzoate of soda whereby the corn is softened but the acidity of the same is minimized so as to minimize thinning.

6. In the production of starch from corn the improvement which comprises: steeping the corn in two stages in the first of which sulfur dioxide is introduced into the steep water in quantity to be absorbed by the corn, and in the second of which the introduction of sulfur dioxide is discontinued and there is introduced into the steep water a small quantity of benzoate of soda whereby enzymic and bacterial activity and the production of acids is reduced and the thinning of the starch minimized.

7. In the production of starch from corn the improvement which comprises: steeping the corn in two stages in the first of which sulfur dioxide is introduced into the steep water in quantity to be absorbed by the corn, and in the second of which the introduction of sulfur dioxide is discontinued and there is introduced into the steep water a germicide of the group consisting of benzoate of soda and benzoic acid, whereby enzymic and bacterial activity and the production of acids are reduced and the thinning of the starch minimized.

J PAUL BISHOP.
WILLIAM FOLEY HENRY.